July 19, 1955   P. GRODZINSKI ET AL   2,713,259
APPARATUS FOR TESTING THE HARDNESS OF MATERIALS
Filed Dec. 21, 1949   4 Sheets-Sheet 1

Inventors.
Paul Grodzinski,
Werner Stern, &
Frederick Arthur Beard,
By

July 19, 1955  P. GRODZINSKI ET AL  2,713,259

APPARATUS FOR TESTING THE HARDNESS OF MATERIALS

Filed Dec. 21, 1949  4 Sheets-Sheet 2

Inventors,
Paul Grodzinski,
Werner Stern, &
Frederick Arthur Beard,

By

July 19, 1955     P. GRODZINSKI ET AL     2,713,259

APPARATUS FOR TESTING THE HARDNESS OF MATERIALS

Filed Dec. 21, 1949     4 Sheets-Sheet 3

Inventors,
Paul Grodzinski,
Werner Stern, &
Frederick Arthur Beard,
By    Atty.

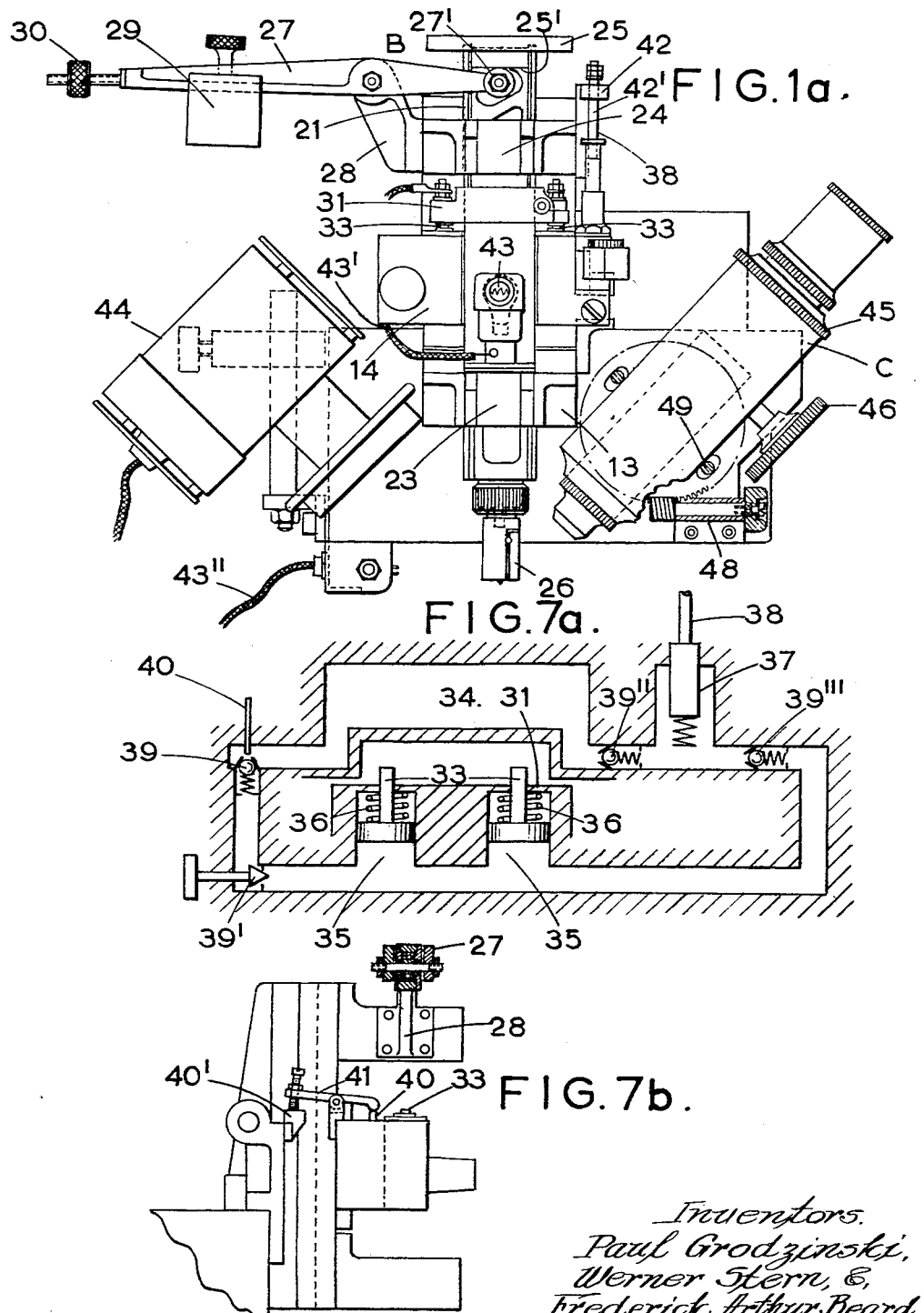

United States Patent Office 2,713,259
Patented July 19, 1955

2,713,259

APPARATUS FOR TESTING THE HARDNESS OF MATERIALS

Paul Grodzinski, London, Frederick Arthur Beard, Peterborough, and Werner Stern, Wembley Park, England Application December 21, 1949, Serial No. 134,197

11 Claims. (Cl. 73—81)

The invention relates to apparatus for testing the hardness of materials of the type in which an impression is made in a specimen and this impression then viewed through a microscope without removing the specimen from the table of the apparatus. In apparatus of this type there is usually provided a pivot about which either the indenting device or the microscope is swung to bring the one or the other into operative position. It is one object of the invention to make an indentation and then to measure the size of the indentation under the microscope without any movement of indentor or microscope except the necessary axial adjustment towards and away from the specimen for applying and withdrawing the indentor and for focusing the indentation.

Is is another object of the invention to apply the load directly to the vertically guided indentor so as to minimize errors.

It is a further object of the invention to arrange the indentor and microscope in such a way that the axes of the mechanical (indentor) system and the optical system intersect at a suitable angle on the surface of the specimen.

It is another object of the invention to avoid any shock on the indentor engaging the specimen independent of the skill of the operator by automatically applying the load on the indentor at a predetermined rate using a hydraulic load releasing device. The load is gradually transferred to the indentor on the specimen until the whole load rests on the indentor point. This is indicated to the operator by the extinguishing of an electric light owing to the interruption of an electric circuit between the load releasing device and the indentor holder.

It is a further object of the invention to have an elongated, e. g., boat-shaped indentation made facilitating the adjustment and measurement of the length of the indentation by using an indentor based on the use of a curved edge, preferably as part of a circular edge produced as the intersection of two cones or, more generally, of two co-axial surfaces of revolution of substantially identical shape, as e. g., of two paraboloids.

The apparatus according to the invention comprises a base with a pillar carrying the height adjustable mechanical (indentor) and the optical system and a base carrying the height adjustable table for the specimen, preferably arranged on an intermediate arrangement of cross-slides for adjusting a selected surface point in the axis of the indentor.

The mechanical system is mounted on a block with upper and lower bracket, containing sets of adjustable rollers (miniature ball bearings) for clearance free guidance of the vertical indentor holder, a support for the balancing lever of the holder, the hydraulic system including a pump and load releasing device, and the signal lamp.

The block is vertically slidable on a support to be clamped at a convenient height on to the pillar of the apparatus. The support carries also the optical system to be described later on. The sliding block is partly balanced by a counter-weight arranged in the hollow pillar and connected to the block by a wire running over pulleys. The block as a whole is raised and lowered by a spindle with hand wheel and pinion engaging a rack on the block, a weighted lever being clamped to the spindle so as to hold the block in raised (inoperative) position but to be inactive in lowered (operative) position.

The optical system comprises an illuminating device projecting a ray of light at an angle onto the surface of the specimen and a microscope for viewing the specimen surface at an angle from the opposite direction. The angular positions being fixed, the microscope can be withdrawn axially out of the way while lowering the indentor onto the specimen. The load releasing device is arranged between the brackets containing the guiding rollers for the indentor holder. It consists of an oil pump actuated by the reciprocating movement of the indentor block co-operating with a stop on the support for the mechanical and optical system, and two plungers symmetrically arranged, one to the right and the other to the left of the indentor axis engaging a cross piece on the indentor holder owing to the built-up oil pressure. An adjustable release valve to be actuated by a pin co-operating with an adjustable stop on the fixed support serves for decreasing the pressure resulting in gradual withdrawal of the plungers by spring means at a rate pre-set by the release valve. When the indentor point touches the specimen surface the whole load is directly transferred to the point while a gap opens between the plunger ends and the cross piece indicated by the extinguishing of an electric lamp in front of the holder in an electric circuit interrupted by the gap.

The indentor, preferably employed for making elongated, i. e. long and narrow impressions is produced by polishing part of a diamond so that a curved edge is developed as the intersection of two co-axial surfaces of revolution. The diamond is set in a holder in such a way that its position may be changed by rotating the indentor about the axis of the cones. As the impression is made tangentially to the circle presented by the intersection of the two co-axial surfaces the shape of the indentation remains the same at any point of the circle. Therefore, it is not necessary to exchange the indentor if it should have been nicked by impact or by hard components in the specimen to be tested. A slight adjustment will be sufficient, a small rotation about the center to bring another point of the circumference into action.

An apparatus embodying the above and other features of the invention will now be described by way of example and with reference to the drawings in which:

Fig. 1a is part of a front view of the apparatus showing details of the signal lamp arrangement.

Figures 2, 3:
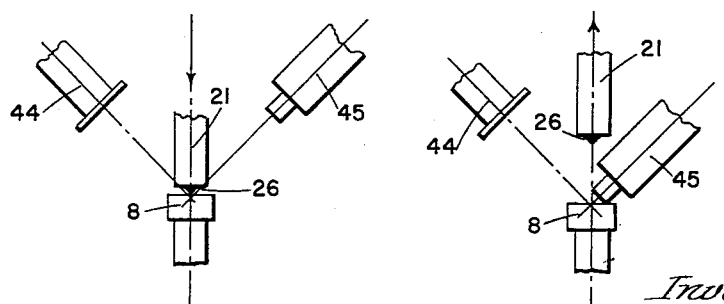

Fig. 2 indicates diagrammatically the position of the indenter and the microscope when making an impression.

Fig. 3 indicates diagrammatically the position of the indenter and the microscope when measuring the size of the impression.

Figure 4:
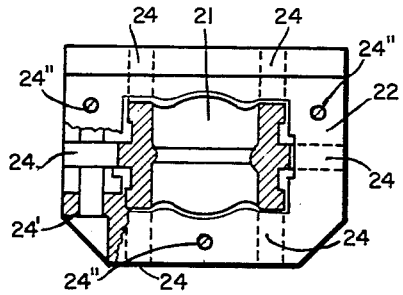

Fig. 4 is a fragmentary cross-section showing the arrangement of the indenter holder between its guiding rollers.

Figure 5:
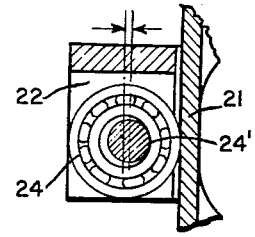

Fig. 5 is a section through one of the guiding devices of the indenter holder.

Figure 6:
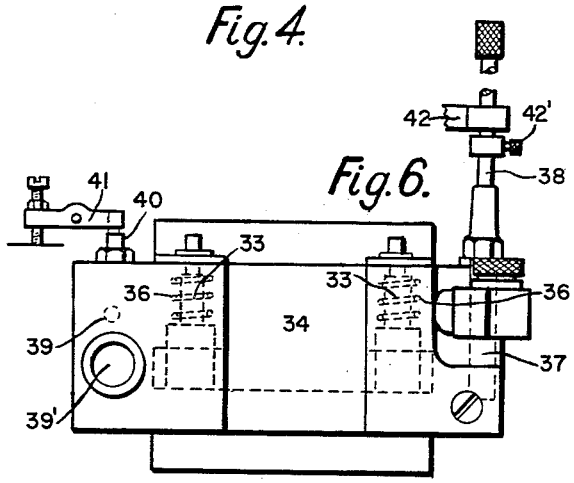
Figure 7:
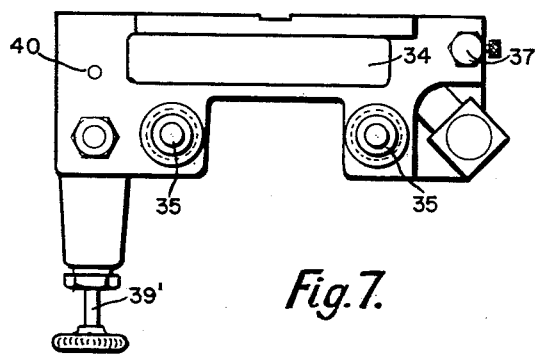

Figs. 6 and 7 are respectively front elevational and plan views of the pumping and valve release mechanism.

Fig. 7a is a diagram of the closed fluid circuit showing the valves and pistons.

Fig. 7b is a detail of the trip device operating the release valve.

Figure 8:
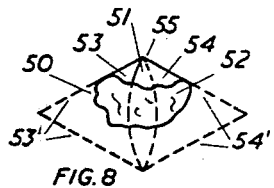
Figure 9:
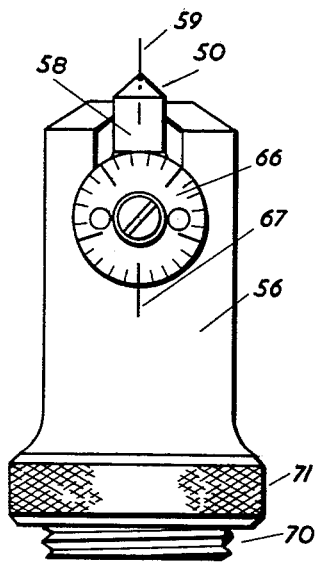
Figure 10:
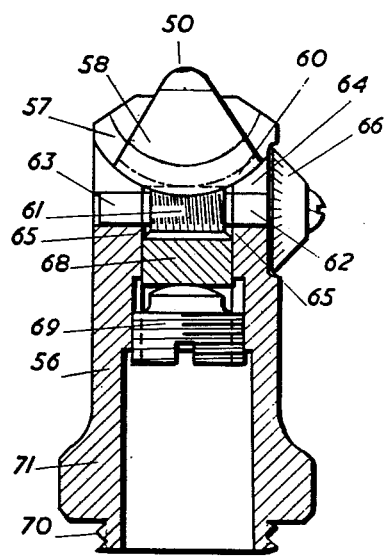

Fig. 8 is a perspective view on an enlarged scale of an indenter diamond part of which is polished to the shape of a double-cone, Figs. 9 and 10 are respectively side elevational and cross-sectional views of an indenter mounting for changing the position of the indenting edge along its circumference.

Figure 11:
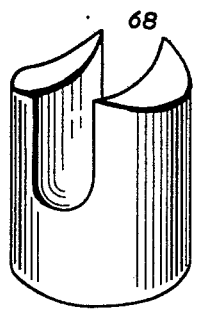

Fig. 11 is a perspective view of the clamping piece used in the mounting.

The apparatus consists of three parts, a base A with the adjustable table carrier and cross-slides for the specimen and an upright pillar carrying the adjustable main support, the mechanical (indenter) system B with the indicator slidably arranged on the main support, and the optical system C attached to the main support together with the illuminator.

On a boss 1 on the front part of a base 2 is mounted a tubular holder 3 guided in a bracket 4. A portion of the holder 3 is threaded and the threaded ring 5 between the boss 1 and the bracket 4 serves for adjusting the tubular holder 3. Screwed on top of holder 3 is an intermediate piece 6 with a center pin to accommodate a compound slide 7 enabling a specimen holder 8 to be fine adjusted by micrometer screws 9 and 10. Upright pillar 11 on the rear part of base 2 carries a support 12, clamped to the pillar at a suitable height. The tubular holder 3 and the pillar 11 are arranged in diagonal position on the base 2 so as to obtain a convenient position for the support 12.

Support 12 is provided with vertical guide ways 13 for the block 14 carrying the indenter mechanism and raised and lowered by hand wheel 15 on spindle 16 through rack and pinion means (not shown). Part of the weight of the block 14 including the mechanism is balanced by a counterweight sliding in the hollow pillar 11 connected to the block by a wire 17 running over a pulley 18. To secure the block in raised position with the indenter inoperative and also in its downward operative position, a lever 19 is clamped to the spindle 16 with an adjustable weight 20 so as to supplement the counterweight mentioned above when the block 14 with the indenter is raised into inoperative position but to remain inactive in lowered, operative position.

The indenter holder 21 is guided in brackets 22 and 23 between sets of rollers each consisting of six miniature ball bearings 24. The ball bearings 24 (Fig. 5) are arranged on eccentric shafts 24' so that, by turning more or less some of the shafts or all of them as the case may be, the vertical position of the holder 21 and the clearance between the bearings and the holder may be finely adjusted. The shafts are locked in position by set screws 24" (Fig. 4). The indenter holder is provided with a platform 25 on top for applying different loads using accurate weight blocks of preferably between 200 and 1500 g. as the case may be. At the bottom end of the indenter holder 21 is exchangeably mounted the diamond indenter 26 which may be, e. g., a standard diamond pyramid (Vickers) indenter, or a double-cone indenter as described below.

The weight of the indenter assembly, i. e. holder 21 and indenter 26, is accurately balanced by balance lever 27 supported on a bracket 28 attached to the block 12 and provided with a sliding weight 29 and a threaded ring 30 for coarse and fine adjustment. The inner end 27' of lever 27 is in rolling contact with the underside 25' of platform 25 (Fig. 1a). The hydraulic load releasing device used for applying the load gradually at a pre-determined rate when lowering the indenter point on to the specimen is arranged between the brackets 22 and 23. The weight of the indenter assembly, holder 21 and diamond indenter 26, is transferred by the cross-piece 31 on to plungers 33 raised by a hydraulic pressure device described below. The gradual release of the pressure is initiated by a pin on the device (not shown) pressed downward by a lever when lowering the block by engaging an adjustable stop on the fixed support 12. The indenter assembly moves slowly downward until the indenter point contacts the specimen 32 at a certain rate of speed determined by the lowering of the plungers 33.

Figure 1:
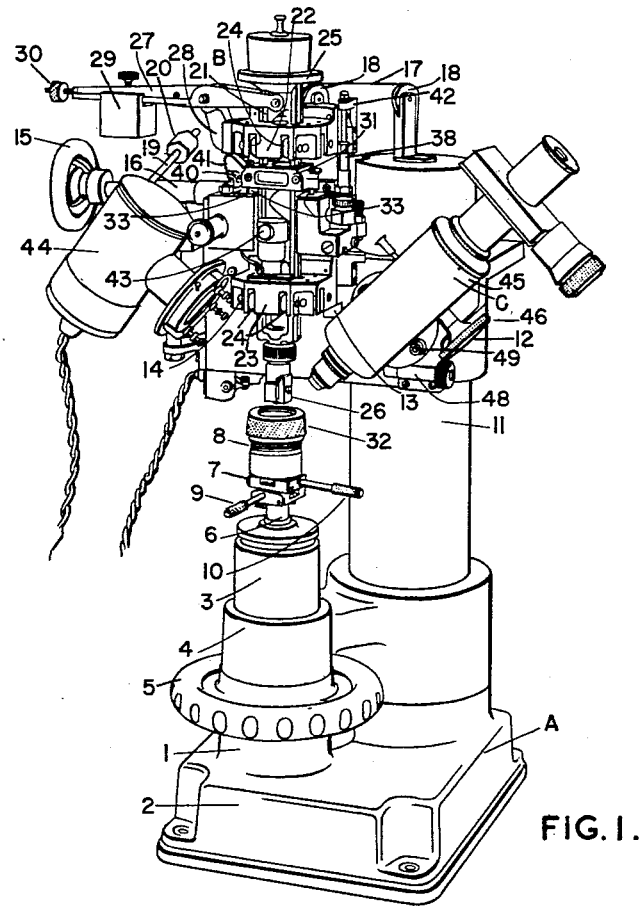
Fig. 1 is a perspective view of the apparatus.

The hydraulic system shown diagrammatically in Figs. 6, 7 and 7a comprises the oil reservoir 34, the two cylinders 35 with plungers 33 and return springs 36, the pump cylinder 37 with its vertically upwardly projecting piston rod 38 and the required valves, suction valve 39", delivery valve 39"', control valve 39' for adjusting the speed of oil release, and release valve 39 operated by a projecting pin 40 (Fig. 7b) and a stop 40' on the support in combination with lever 41 pressing the pin 40 downward and opening the release valve 39. The oil pressure is built up by piston rod 38 actuated by the movement of the indenter assembly, the projecting bracket 42 co-operating with a preferably adjustable stop 42' on piston rod 38 passing through the bracket (Figs. 1 and 1a). During the lowering movement of the indenter assembly, when lever 41 engages a stop on the fixed support, the other end of lever 41 is tipped pressing pin 40 and thus opening the oil passage to the reservoir. The oil under pressure flows from under the plungers back to the reservoir, its speed or pressure decrease being determined by the setting of the control valve, so that the indenter point moves downward at a constant pre-determined speed until it contacts the specimen surface under transference of the load from the plungers to the indenter point. This transference takes place within a fraction of a second during the first part of the indentation. It is indicated by the extinguishing of an electric lamp 43 arranged in front of the indenter assembly (Fig. 1a.)

The signal lamp current is carried through flexible lead 43" to lamp 43 and from lamp 43 through flexible lead 43' to block 14. The plunger 33 on the left side of Fig. 1a closes the circuit by contact with the left insulated carrier pin (not shown in detail) of crosspiece 31 and the flexible lead on this pin, part of which is shown in the drawing. It is evident that on the recession of the plungers 33 a gap will appear between the plungers and the carrier pins when the indenter touches the specimen surface thus stopping the downward movement of the indenter assembly and this will interrupt the signal lamp circuit precisely at this moment.

The optical system comprises the illuminator 44 and the microscope 45 arranged at an angle to the direction of the indenter movement in such a manner that their inclined axes intersect on the specimen surface. The illuminator is provided with an iris diaphragm to arrange for a suitably sharp illumination. It is mounted height adjustable and for angular adjustment so as to cause the ray of light to intersect the microscope axis at the precise spot desired on the surface of the specimen. The microscope 45 is brought into operative position and withdrawn into inoperative position by a hand wheel 46 operating a rack and pinion device. The microscope holder is mounted on a vertical turntable for angular adjustment on support 12 by a worm gear 49. To enable a further fine adjustment of the optical axis in the plane going through the axis of the ray of light and the path of the indenter point, a horizontal displacement of the microscope holder at right angles to this plane may be provided.

Fig. 8 shows an indenter produced from a diamond 50 by polishing part 51 of it only, so that at part 52 conical faces develop at 53 and 54 which intersect in circular arc 55 forming the indenter edge. The dotted lines 53', 54' show the two cones of which faces 53 and 54 form parts.

In Figs. 9 and 10, the holder 56 has a dovetail groove 57 forming a circular arc in which the sector-shaped mount 58 for the diamond 50 is slidably arranged in such a manner as to move in a circular path around the center line 59, i. e. the axis of the double-cone 53, 53', 54, 54' of indenter 50 (Fig. 8). The sector-shaped mount 58 is provided with a worm-wheel thread 60 meshing with worm 61 on shaft 62, preferably a micrometer screw, which is supported in slots 63, 64 of holder 56. Brass rings 65 on shaft 62 keep the worm 61 in position.

The pitch circle radius of worm gear 60, 61, is preferably a multiple of the radius of the circular arc 55. A dial 66 on the shaft 62 in combination with an index line 67 on the holder 56 facilitates adjustment in small increments by turning the worm 61.

The sector mount 58 is clamped after adjustment against its dovetail guide groove by a fork-shaped block 68 (Fig. 11) under pressure of the set-screw 69. To enable the holder 56 to be screwed on to a hardness testing apparatus of known design, it is provided with a threaded boss 70 and serrated rim 71 to be adapted to the design as required.

For calculating the hardness from the size of the impression obtained, it is recommended to measure the length of the impression microscopically and then to calculate the unrecovered area of the impression by considering it limited by a parabola (the real shape is a hyperbola as the intersection of a plane parallel to the axis of a cone with this cone).

The compilation of comparison tests in the table shows that the results obtained are well related to those determined with the same load on the same sample with ordinary pyramidal (Vickers, Knoop) indenters. In these tests, the load was $L=150$ grams. The impressions were made on copper and the load applied for 15 sec. The dimensions were measured under the microscope at a magnification of $400\times$.

The radius of the new arcuate indenter edge was $R=3$ mm., the point angle $\angle \alpha=120$ deg.

*Table*

| Hardness Ind. | Longest diag. (mm.) $l$ | Actual Area, projected | Calcul. Area F[1] (sq. mm.) | Hardness calculated |
|---|---|---|---|---|
| Vickers Pyramid | 0.0475 | 0.001312 | 0.001216 | 123 |
| Knoop Indenter | 0.13 | 0.001465 | 0.001188 | 126 |
| Double-Cone | 0.2025 | 0.00135 | 0.001055 | 142 |

[1] For Vickers, the formula $F=l^2/1.854$ was used, for Knoop the standard Knoop formula $F=0.0703\, l^2$, for the double-cone indenter, formula
$$F=\frac{1}{6}\times\frac{l^3 \tan\frac{\alpha}{2}}{R}.$$

*Operation.*—After the indenter and the optical system have been centered, the test load (weight) is placed on platform 25, the microscope tube moved out of the way of the indenter path, and the indenter slide racked down by the hand wheel 15 to a dead stop. The indenter point is then a few millimeters above the surface of the specimen and the indenter assembly is held back by the hydraulic system. In the lowest position the release lever for the hydraulic system is automatically tipped, opening the release valve; when the hydraulic fluid passes, the two plungers 33 supporting the indenter recede and allow the full load to be applied to the indenter. After a suitable period of, say, 15 to 30 seconds under full load, the indenter is racked back to the upper position and the optical system is brought into focusing position.

Good results were obtained with a 25 mm. objective and a magnification up to $150\times$. It is apparent that modifications of the apparatus are possible within the scope of the invention. For instance, automatic operation may be provided by using a time relay or a process timer. Scratch tests may be carried out by operating the micrometer screws of the compound slides when the indenter is resting on the specimen. Or electronic devices may be used for automatically controlling the movements of the indenter and the change over to the optical system.

Various changes may be made to the form of the invention herein shown and described without departing from the spirit of the invention or scope of the claims.

We claim:

1. Apparatus for testing the hardness of materials comprising a holder for receiving a specimen for testing, an axially movable shaft disposed above said holder with its axis extending perpendicular to the surface of the specimen which is to be tested, an indenter mounted on said shaft and facing said specimen surface, said indenter element having a curved operative edge facing said specimen, means for axially moving said shaft to cause said indenter to make an indentation in said specimen and to thereafter retract said shaft and said indenter while said specimen remains in test position, a light source disposed alongside and shaft on one side thereof for projecting a beam of light upon the surface of said specimen at an angle which is less than 90° to the axis of said shaft and said indenter, an optical unit including an objective disposed above said specimen alongside said shaft in a position for viewing the surface from a point opposite said light source with its longitudinal axis extending also at an angle which is less than 90° to the axis of said shaft and said indenter, the angle between the axis of said light source and that of said objective being less than 180°, and means for axially moving the objective of said optical unit after retraction of said indenter into close proximity of the indented surface of said specimen for microscopic inspection thereof under the illumination of said light source.

2. Apparatus for testing the hardness of materials comprising a carrier for supporting a specimen for testing, an indenter and a holder therefor, said indenter having a curved operative edge facing said specimen, an optical unit including a microscope, a support, means for adjustably mounting said indenter holder and said microscope on said support with the longitudinal axes thereof in intersecting relationship at an angle of less than 90°, and means for axially independently moving said indenter holder and said microscope, respectively, so as to place said indenter and one end of said microscope selectively to occupy substantially the identical space relative to and above the surface of said specimen.

3. The apparatus as set forth in claim 2, together with means for adjusting said specimen-supporting carrier horizontally and vertically for the purpose of determining the point of intersection of the axes of said microscope and said indenter holder on the surface of said specimen in test position thereof.

4. The apparatus as set forth in claim 2, comprising a plurality of vertically spaced guide members, eccentrically mounted rollers in engagement with said holder disposed therealong between said guide members, and means for adjusting the lateral position of each roller towards and away from said holder by turning its associated eccentric mounting means to shift the position of the axis of said holder.

5. Apparatus for testing the hardness of materials comprising a carrier for supporting a specimen for testing, a support, an indenter and a movable holder therefor, said indenter having a curved operative edge facing said specimen, an optical unit including a microscope disposed above said specimen, guide means on said support for guiding said indenter holder for straight-line motion perpendicular to the surface of said specimen, guide means on said support for guiding said microscope for straight-line motion at an angle to the surface of said specimen, the axes of said guide means forming an angle of less than 90°, means for adjusting the position of said carrier to determine the position of said specimen relative to the point of intersection of said axes, means on top of said indenter holder forming a platform for receiving a load, lever means pivotally mounted on said support, one end of said lever means being in engagement with said holder underneath said platform, and a counterweight carried adjustably on said lever means at the other end thereof.

6. The structure as set forth in claim 5, comprising a block member for carrying said guide means for said indenter holder, means for vertically slidably mounting said block on said support, lever means for raising and for lowering said block, means for counterbalancing the weight of said block and associated elements, and a weight on said lever means for holding said block against displacement in its extreme upper terminal position by acting in the same sense and supplementing the said counterbalancing means in this position while remaining inactive in the lower terminal position of the block.

7. Apparatus for testing the hardness of materials by applying the point of an indenter member under load to the surface of a specimen comprising a movable holder carrying an indenter member the point of which faces said specimen, a movable support for said holder, means for placing a test load on said holder substantially vertically above the point of said indenter member, hydraulic means for holding said supporting means in elevated position to hold said indenter point spaced from the surface of said specimen, means for moving said holder toward said movable support, and means responsive to the arrival of said holder at said support for releasing the pressure of said hydraulic means to continue the movement of said holder and said indenter point at a predetermined rate until the point of said indenter engages the specimen surface with gradually increasing force gradually giving effect to the full test load on said holder.

8. In an apparatus for testing the hardness of materials by applying the point of an indenter member under load to the surface of a specimen comprising a vertically disposed holder carrying at its lower end an indenter member which faces the surface of said specimen and carrying at its upper end a predetermined test load, a hydraulic load-releasing device comprising a pair of vertically disposed cylinders each containing a plunger means and means for downwardly resiliently biasing said plunger, hydraulic pressure acting upon said plungers against the force of said biasing means so as to cause said plungers to serve as supporting means for said holder, means forming a reservoir for a hydraulic fluid, means for raising the pressure in said cylinders independently of the pressure in said reservoir, an adjustable release valve for connecting said cylinders and said reservoir for the purpose of gradually lowering said plungers to lower the indenter holder at a predetermined rate so as to allow downward displacement of said holder and coacting indenter member relative to said specimen.

9. The structure as set forth in claim 8, comprising a fixed support, block means slidably disposed on said fixed support, for guiding said indenter holder, an operating member projecting from said release valve upwardly, trip means arranged on said block means for actuating said operating member, pivot means for said trip means disposed on said block means, and a stop on said fixed support for engagement by said trip means.

10. Apparatus for testing the hardness of materials by applying the point of an indenter member under load to the surface of a specimen comprising a fixed support, an adjustable indenter carrier, a movable support in said carrier, an indenter holder guided in said carrier on said movable support, the load being transferred from said movable support to the indenter point during the downward movement of the indenter holder, a block disposed vertically slidably on said fixed support, means for disposing said indenter carrier on said block, guide means for said holder disposed on said block, a hydraulic load-releasing device for controlling the recession of the said support comprising a pump for building up pressure for said hydraulic device, a pump cylinder mounted on said block, a piston projecting upwardly from said pump cylinder, an adjustable collar carried by the piston rod of said piston, stop means on said fixed support for engagement by said collar for causing a pumping stroke responsive to sliding displacement of said block on said fixed support, and a release valve for gradually reducing the built-up pressure causing a corresponding recession of the movable support of said indenter holder.

11. Apparatus for testing the hardness of materials by applying the point of an indenter member under load to the surface of a specimen, comprising a fixed support, a block member disposed vertically slidably on said fixed support, an indenter holder including said indenter member, guide means on said fixed support for slidably holding said holder relative thereto, vertically movable supporting means for said indenter holder arranged in said block, contact means formed by said movable supporting means and by said indenter holder, and signal means controlled by said contact means for indicating the transfer of the load from the supporting means to the indenter point of said indenter member, said contact means being interrupted by the recession of said movable supporting means to place the point of said indenter member in engagement with the surface of said specimen.

References Cited in the file of this patent

UNITED STATES PATENTS

| | | |
|---|---|---|
| 1,763,400 | Lewis | June 10, 1930 |
| 1,770,046 | Shore | July 8, 1930 |
| 1,830,842 | La Vercombe | Nov. 10, 1931 |
| 2,088,371 | Gogan | July 27, 1937 |
| 2,109,521 | Ballentine | Mar. 1, 1938 |
| 2,182,235 | Polushkin | Dec. 5, 1939 |
| 2,188,992 | Wolpert et al. | Feb. 6, 1940 |
| 2,285,200 | Gilmore | June 2, 1942 |
| 2,289,874 | Curtis | July 14, 1942 |
| 2,422,634 | Riepert et al. | June 17, 1947 |
| 2,436,435 | Kent | Feb. 24, 1948 |
| 2,472,927 | Taylor et al. | June 14, 1949 |
| 2,491,667 | Kent | Dec. 20, 1949 |

FOREIGN PATENTS

| | | |
|---|---|---|
| 568,327 | Great Britain | Mar. 29, 1945 |